P. C. McCUNE.
Horse-Power.
No. 215,383. Patented May 13, 1879.
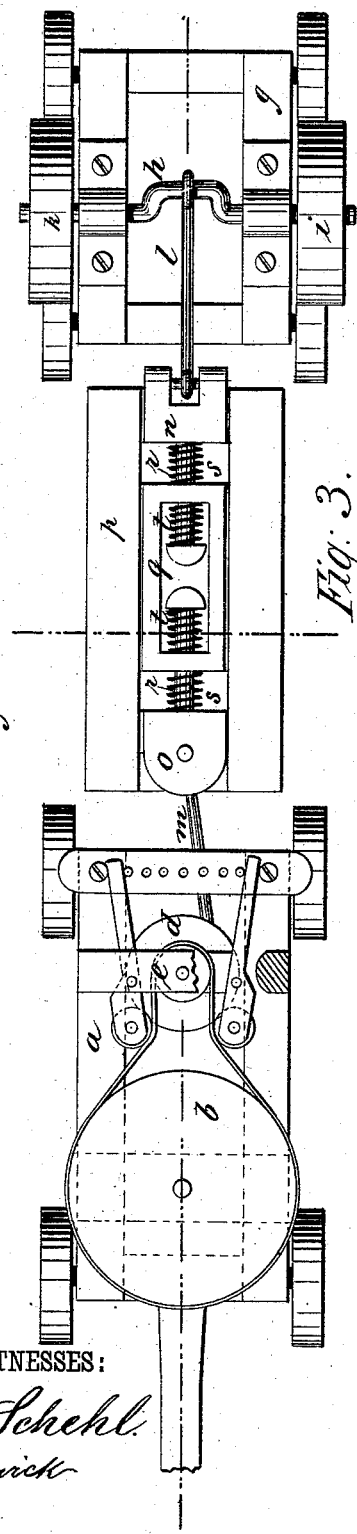
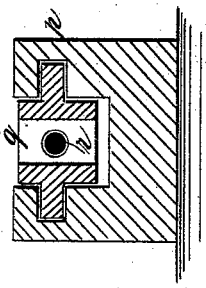
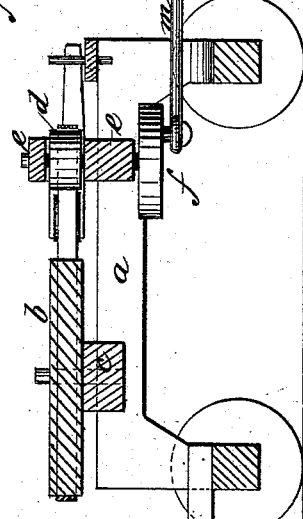
WITNESSES:
A. Schehl
C. Sedgwick
INVENTOR:
P. C. McCune
BY Munn & Co.
ATTORNEYS.

UNITED STATES PATENT OFFICE.

PARDON C. McCUNE, OF MOUNT ETNA, IOWA.

IMPROVEMENT IN HORSE-POWERS.

Specification forming part of Letters Patent No. 215,383, dated May 13, 1879; application filed January 2, 1879.

*To all whom it may concern:*

Be it known that I, PARDON C. McCUNE, of Mount Etna, in the county of Adams and State of Iowa, have invented a new and useful Improvement in Horse-Powers, of which the following is a specification.

My invention relates to horizontal or sweep horse-powers; and the object is to apply a balance-wheel in connection with horse-powers used for thrashing grain in place of the tumbler-rods generally employed, so as to obtain a uniform and regular application of the power to the thrashing-machine, and prevent strain upon the machinery in stopping the power.

I make use of a balance-wheel placed upon a shaft from which the power is taken to drive the thrashing-machine, which shaft is driven through the medium of pitman-rods and slides having spring-connections, connected with a counter-shaft that is geared to the master-wheel of the power, so that while the parts operate usually similarly to positive connections the spring-connections permit independent movement of the balance-wheel from the master-wheel in case of sudden jerks and in stopping the power.

In the accompanying drawings, Figure 1 is a general plan of the horse-power. Fig. 2 is a side elevation. Fig. 3 represents the slide.

Similar letters of reference indicate corresponding parts.

The power is set upon a bed, $a$, which may be on wheels for convenience of transportation.

The master-wheel $b$ and its supporting-frame $c$ are of usual character, and $d$ is a pinion, operated by master-wheel $b$, said pinion $d$ being upon a short vertical shaft that is fitted in bearings $e$ on frame $c$, and carries also a crank-wheel, $f$.

The frame $g$ represents the frame of a thrashing-machine. $h$ is a crank-shaft, fitted across frame $g$, and having keyed upon it the balance-wheel $i$ and a pulley, $k$, from which power is taken to run the thrashing-machine or separator.

$l$ is a pitman from the crank of shaft $h$, and $m$ is a pitman from crank-wheel $f$. These pitman-rods are connected respectively to cross-heads $n$ $o$, that are fitted to slide in the slide-way $p$, and the heads $n$ $o$ are connected to a central slide, $q$, which also moves in way $p$.

The connection between each head $n$ $o$ and slide $q$ is made by a bolt, $r$, that passes loosely through the end of $q$ into the head $n$ or $o$, the nut of the bolt being in a mortise formed in the head. The bolts are loose, and carry spiral springs $s$ $t$, which are rigid enough to make a firm, but elastic, connection of the parts, so that the revolution of pinion $d$ shall be transmitted to shaft $h$ and balance-wheel $i$.

It is evident that by the above-described construction the power is rendered more uniform and regular in its action, and the balance-wheel placed under perfect control. Any sudden lurches of the horse will not affect the thrashing-machine, as their force will be expended in the spring-connections, and in case the power is stopped the momentum of the balance-wheel can carry shaft $h$ around independently of the power until it stops, the spring-connections permitting such movement and restoring the parts to their normal position.

I do not limit myself to the exact details of construction set forth, as they may be varied without departing from my invention. Belts may be used in place of gearing, and the power used for other purposes than driving thrashing-machines. The pitman-rods may be attached to their cross-heads by a screw connected so that their length may be adjusted after the power and slides have been put in position at the place where they are to be used.

Having thus described my invention, I claim as new and desire to secure by Letters Patent—

In horse-powers, the balance-wheel crank-shaft $h$, connected with the master-wheel $b$ by the pitman $l$, the slides $n$, $o$, and $q$, held together by spring-bolts $r$, the pitman $m$, the crank-wheel $f$, and pinion $d$, as shown and described.

PARDON C. McCUNE.

Witnesses:
H. L. SWEET,
GILBERT MOTT.